(12) United States Patent
Malmin

(10) Patent No.: US 6,740,881 B2
(45) Date of Patent: May 25, 2004

(54) ANISOTROPIC TRANSFER FUNCTION FOR EVENT LOCATION IN AN IMAGING DEVICE

(75) Inventor: Ronald E. Malmin, Chicago, IL (US)

(73) Assignee: Siemens Medical Solutions USA, Malvern, PA (US)

( * ) Notice: Subject to any disclaimer, the term of this patent is extended or adjusted under 35 U.S.C. 154(b) by 63 days.

(21) Appl. No.: 10/247,582

(22) Filed: Sep. 20, 2002

(65) Prior Publication Data

US 2004/0057550 A1 Mar. 25, 2004

(51) Int. Cl.[7] ................................................. G01T 1/20
(52) U.S. Cl. .............................. 250/363.01; 250/361 R; 250/370.08
(58) Field of Search ........................ 250/363.01, 370.11, 250/370.01, 361 R, 362, 363.02, 363.04, 363.1

(56) References Cited

U.S. PATENT DOCUMENTS

| | | |
|---|---|---|
| 3,752,982 A | 8/1973 | Jaszczak |
| 4,115,694 A | 9/1978 | Lange et al. |
| 4,223,221 A | 9/1980 | Gambini et al. |
| 4,323,977 A | 4/1982 | Arseneau |
| 4,424,447 A | 1/1984 | Lelong et al. |
| 4,582,995 A | 4/1986 | Lim et al. |
| 4,588,897 A | 5/1986 | Inbar et al. |
| 4,611,283 A | 9/1986 | Lumensky et al. |
| 5,173,608 A | 12/1992 | Motomura et al. |
| 5,293,044 A | 3/1994 | Klingenbeck-Regn et al. |
| 5,410,153 A | 4/1995 | Ferreira |
| 5,491,342 A | 2/1996 | Lim et al. |
| 5,576,547 A | 11/1996 | Ferreira et al. |
| 5,606,166 A | 2/1997 | Tararine |
| 5,760,403 A * | 6/1998 | Elabd ..................... 250/370.11 |

OTHER PUBLICATIONS

Adam, Lars–Eric, et al., "Energy–Based Scatter Correction for 3–D PET Scanners using NaI(Tl) Detectors", IEEE Transactions on Medical Imaging, vol. 19, No. 5, pp. 513–52!, May 2000.

Surti, S., "Optimizing the Performance for a PET Detector using Discrete GSO Crystals on a Continuous Lightguide", IEEE Transactions on Nuclear Science, vol. 47, No. 3, pp. 1030–1036, Jun. 2000.

* cited by examiner

Primary Examiner—Constantine Hannaher
Assistant Examiner—Timothy Moran

(57) ABSTRACT

An anisotropic imaging method and apparatus for determining the location of a radiation event. The method includes the steps of obtaining a sensor reading in response to a radiation event and applying an anisotropic transfer function to the sensor reading. The anistropic transfer function adjusts the sensor reading by using a different transfer curve depending upon whether a spatial coordinate of the detected radiation event in the X-axis direction or a spatial coordinate in the Y-axis direction is being calculated.

19 Claims, 6 Drawing Sheets

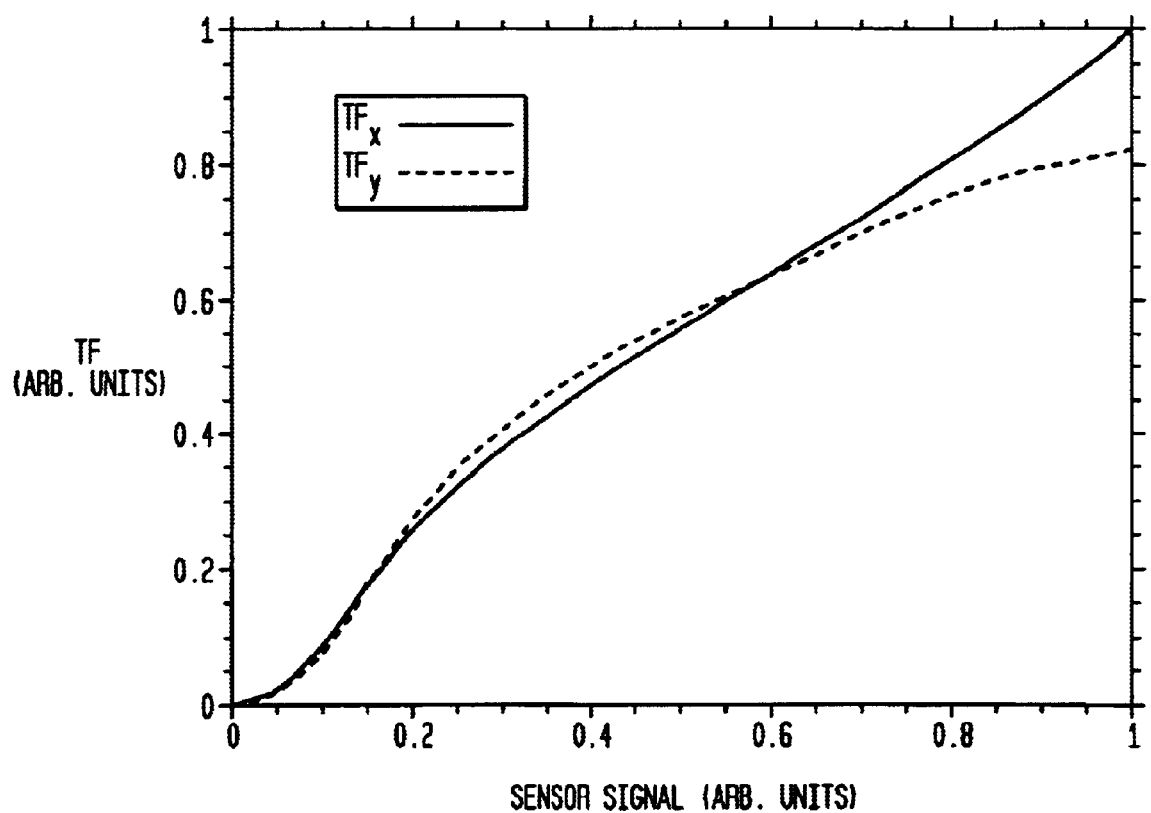

ANISOTROPIC TRANSFER FUNCTION FOR EVENT LOCATION IN AN IMAGING DEVICE

BACKGROUND OF THE INVENTION

1. Field of the Invention

The present invention relates generally to radiant energy imaging devices with anisotropic signal sampling, and more particularly to imaging devices having hexagonal arrays of sensor units for imaging a radiation field.

2. Description of the Background Art

Imaging is the science of capturing images of a target object or process. Imaging may also include processing the captured images or image data in order to provide accurate and useful results. A final image or images may be used for any number of applications, such as, for example, medical imaging, manufacturing, astronomy, seismology, etc.

Imaging may employ any type of radiation in order to form an image. An image may be formed by detecting a response to radiation such as light emission, radioactive decay emission, magnetic waves, radio waves, electrons, etc. Radiographic imaging is the detection of radiation in order to form an image. By detecting the amount of radiation passing through or emanating from a test subject, the resultant image may give a representative view of the materials and construction of the test subject.

Gamma rays are a form of radiation that is emitted by excited atomic nuclei during the process of passing to a lower excitation state. Gamma radiation is capable of passing through soft tissue and bone. Gamma radiation may therefore be used for medical imaging, among other applications.

Gamma radiation for medical imaging usually involves a radiopharmaceutical, such as thallium or technetium, for example, that is administered to the patient. The radiopharmaceutical travels through the patient's body, and may be chosen to be absorbed or retained by an organ of interest. The radiopharmaceutical generates a predictable emission of gamma rays through the patient's body that can be detected and used to create an image. This may include imaging areas of the body or imaging specific organs. For example, a radiographic imaging device may be used to capture images of the heart, including real time images.

A radiographic imaging device may be used to detect radiation emanating from the patient and may be used to form an image or images for viewing and diagnosis. The radiographic imaging device may be a device such as a gamma or gamma ray camera, also referred to as a scintillation camera or an Anger camera. The radiographic imaging device allows a doctor to perform a diagnosis on a patient in a non-invasive manner and additionally may allow the doctor to observe organ function. In addition, the radiographic imaging device may be used for other imaging functions.

FIG. 1 shows a typical gamma camera or gamma camera component unit, including a scintillation crystal 105 having an emission face 108, a sensor 112 or a sensor array, and a processing apparatus 116.

The scintillation crystal 105 is typically a thallium doped sodium iodide crystal that generates photons when impinged upon by radiation, such as gamma radiation (i.e., it scintillates). This scintillation process converts the gamma radiation into light photons, which can be more easily detected. The photons emerge from the emission face 108 and may be detected by the sensor 112 or sensor array.

The sensor 112 may be, for example, a photon detection sensor such as a photomultiplier tube. The sensor 112 receives the photons generated by the scintillation crystal 105 and converts them into a representative electronic signal. A typical photomultiplier tube 112 may include a semi-transparent photocathode, a focusing grid, dynodes, and an anode (not shown). Multiple sensors 112 may be used to form a sensor array in a radiographic imaging device.

The processing apparatus 116 receives the electronic signals from the sensor 112 or sensor array, may amplify and filter the signals, and processes them to form an image.

FIG. 2 is a block diagram of a scintillation crystal 105 and an associated array of sensors 112, as used in a gamma camera, for example. Each sensor 112 has an output which consists of output current signal that may be amplified, filtered and processed to generate an image. The scintillation crystal 105 emits light photons when a radiation photon such as a gamma particle impinges upon the crystal and is absorbed by the crystal, which is referred to as an "event." For example, the event 122 may emit from the point of gamma-ray interaction with the crystal a plurality of photons that may be received by one or more of the sensors 112. It should be understood that the event 122 may be any type of event, including a source of photons, a source of rays due to a radioactive decay, a source of electrons or protons, a source of electromagnetic waves, etc.

FIG. 3 shows a histogram created by photon counts from the sensors 112 during an event 122. A histogram may be thought of as a visual representation of the contents of a series of storage bins that count photons as they are received and categorize them according to the location of the sensors along a predefined direction. The histogram therefore creates a wave form peak. The peak may indicate the approximate center of the event 122 (e.g., a centroid). The centroid may be determined from one or more sensor outputs and may be used to create an image composed of one or more event centroids. Similar considerations apply to the Y-centroid.

FIG. 4 shows an array of sensors 112 and the event 122. Due to the difference in spacing and distribution along the X axis and along the Y axis, as is reflected in the distances $D_X$ and $D_Y$, it is highly desirable that some correction or adjustment be made to the sensor readings in order to accurately determine the centroid of the event 122.

The figure shows an example of a hexagonal sensor array used for imaging a large area. Typically, rows of the contiguous sensors 112 are aligned in the direction of a first Cartesian axis of the scintillation crystal 105, such as an X-axis, for example. However, if the sensors 112 are grouped into an array in a square grid fashion, gaps are left between the individual sensors 112, as the sensors 112 are typically round. Therefore, in order to pack the sensors 112 together as densely as possible, they are typically formed into a grid having a substantially hexagonal arrangement (as shown) in order to minimize gaps between the sensors 112.

FIG. 5 shows the event 122 and the sensors 112 that are affected by the event 122. From FIG. 5 it can be seen that in the X dimension, there are approximately five samples (columns of sensors) within the area of the event 122. However, in the Y dimension, there are only approximately three samples (rows of sensors) within the area of the event 122. Because the sensors 112 are hexagonally packed as shown in FIG. 4, the histogram in the X-axis direction will have more bins than the Y-axis histogram (see FIG. 6), and therefore resolution and linearity along the Y-axis will suffer in comparison to the resolution and linearity along the X-axis.

Early gamma cameras utilized scintillation crystals approximately 1 centimeter (cm) in thickness. For such crystals, the difference in X-axis and Y-axis sampling resolution produces only minor differences in image resolution and linearity characteristics. Recently, however, the crystal thickness has been increased to more than 2.5 cm in order to facilitate detection of high energy radiation. The extra crystal thickness is needed because the high energy radiation penetrates farther into the crystal, while the lower energy radiation does not penetrate very far. The lower energy radiation therefore causes events 122 that are farther from the emission face 108, and the resulting photons may spread more within the scintillation crystal 105. Consequently, the extra crystal thickness increases the disparity between the X and Y direction image resolution/linearity performance.

In the prior art, a positioning algorithm is used to compute a centroid (or center of received radiation or received signal) for each of the X- and Y-axis directions, which may be used to determine the approximate origin of the photons (or other emissions) in two-dimensional space. The event emissions may be used to create histograms, which may in turn be used to calculate the X- and Y-centroids.

The positioning algorithm of the prior art is typically of the form:

$$x' = \frac{\sum_i (x_i Z_i')}{\sum_i Z_i'} \quad (1)$$

where $$Z_i' = TF(Z_i) \quad (2)$$

Equations (1) and (2) may be generalized as:

$$x' = \text{Centroid}(\{x_i, Z_i\}, TF)$$

$$y' = \text{Centroid}(\{y_i, Z_i\}, TF) \quad (3)$$

Where $Z_i$ is the signal from the $i^{th}$ sensor (such as a photomultiplier tube), $[x_i, y_i]$ is the [x,y] position of the $i^{th}$ sensor, and TF is a transfer function that compensates for the location of the sensor with respect to the location of the event in the crystal. The brackets { } define the subset of signals included in the calculation. The "Centroid" may be any centroid-like function, of which equation (1) is merely an illustrative example.

The prior art transfer function TF therefore modifies the sensor signals in such a way as to improve linearity and resolution, using the same function for both X and Y dimensions. The prior art transfer function TF may modify the sensor output signal $Z_i$ to account for the distance from the sensor to the event in the plane of the crystal, sensor size and shape, type of radiopharmaceutical used, crystal thickness, etc.

A consequence of the hexagonal arrangement and the isotropic transfer function of the prior art is that the histogram of sensor signals along the X-axis produces a different set of signal magnitudes than the histogram of sensor signals along the Y-axis. This effect is due to the differences in spacing of the sensors along the X-axis and the Y-axis, as can be seen from the markings along each axis in FIG. 5. The spacing of the sensors along the X-axis is 1*R, where R is the photomultiplier tube radius; while the Y-axis sensor spacing is (√3*R) or (1.73*R). Therefore, when using standard prior art positioning algorithms for generating an image, different resolution and linearity characteristics are obtained in the X and Y directions. The sampling along the X-axis therefore produces a different signal output distribution than sampling along the Y-axis, as shown in FIG. 6.

There remains a need, therefore, for improvements in imaging devices.

SUMMARY OF THE INVENTION

A method is provided according to a first aspect of the invention for event location in an anisotropic imaging device that includes a plurality of sensors arranged in an array. The method includes the steps of obtaining a sensor reading and applying an anisotropic transfer function to the sensor reading which varies in accordance with a direction along the array over which consecutive readings are taken. The anisotropic transfer function adjusts the sensor reading according to a transfer curve that varies as a function of the direction in which the sensor reading is taken over the array.

According to a second aspect of the invention, the anisotropic transfer function adjusts the sensor reading according to a transfer curve that varies as a function of the direction along the array over which consecutive readings are taken and of the distance from the event to the surface of the crystal.

According to yet another aspect of the invention, an anisotropic imaging device is provided that carries the method in accordance with the first aspect of the invention.

The above and other features and advantages of the present invention will be further understood from the following description of the preferred embodiments thereof, taken in conjunction with the accompanying drawings.

BRIEF DESCRIPTION OF THE DRAWINGS

FIG. 7 shows an example of an anisotropic transfer function used in an imaging device according to the invention.

DETAILED DESCRIPTION OF THE PREFERRED EMBODIMENTS

Figure 1:
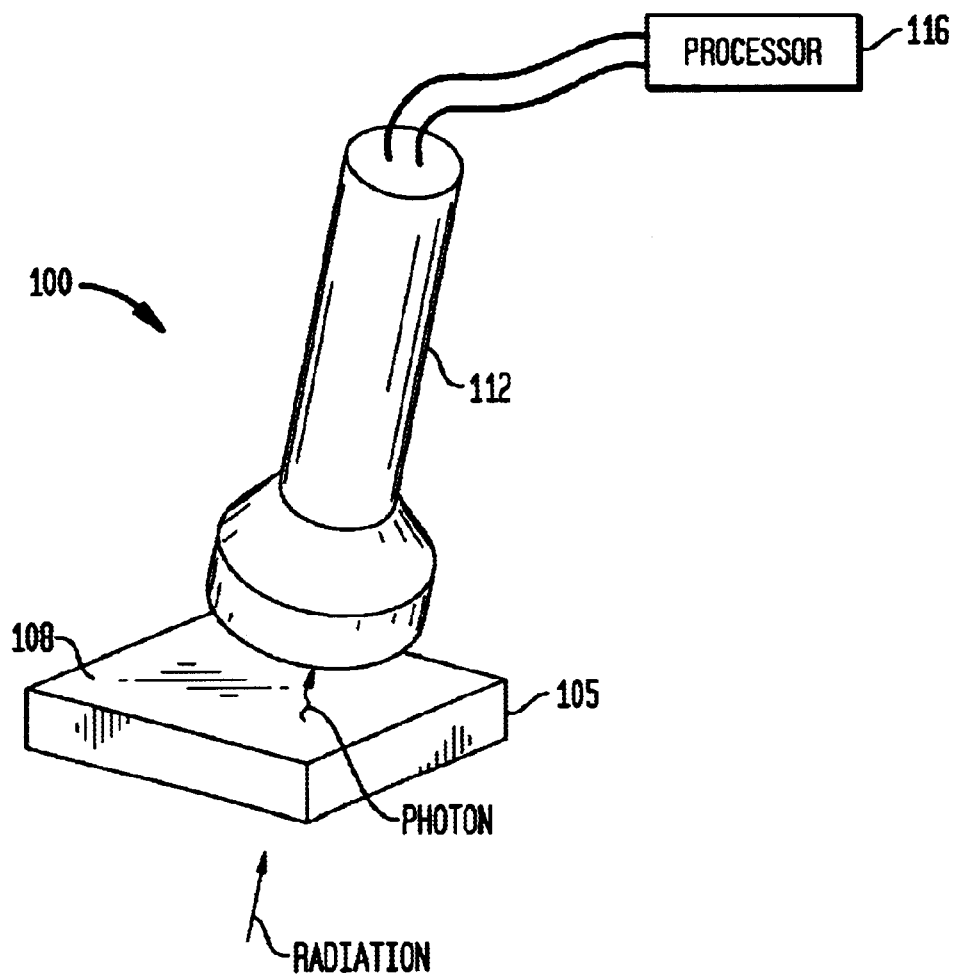
FIG. 1 shows a gamma camera or gamma camera component unit, including a scintillation crystal, a sensor or sensor array, and a processing apparatus.
Figure 2:
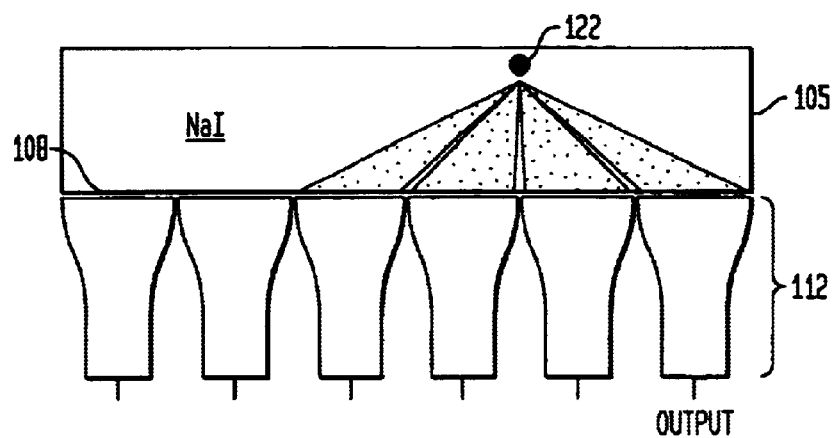
FIG. 2 is a cross-sectional diagram of a scintillation crystal and an associated array of sensors.
Figure 3:
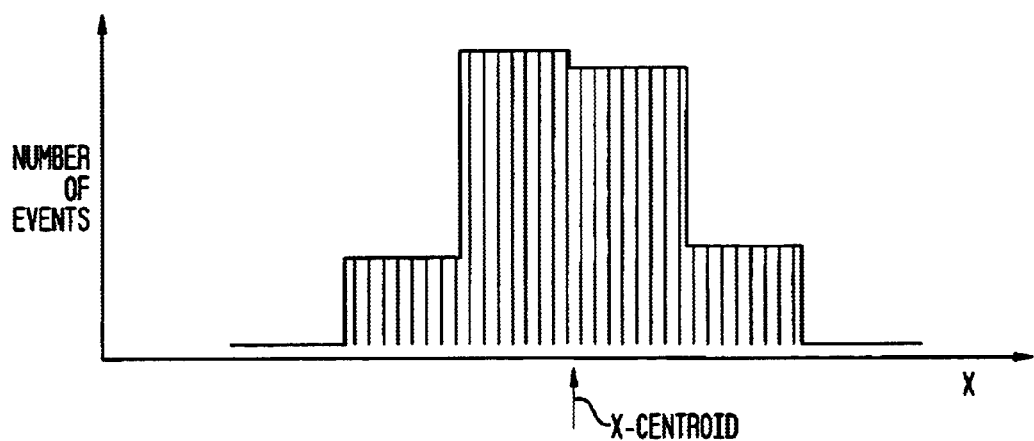
FIG. 3 is a graph that shows a typical light response produced by an array of photon detection sensors during an event.
Figure 4:
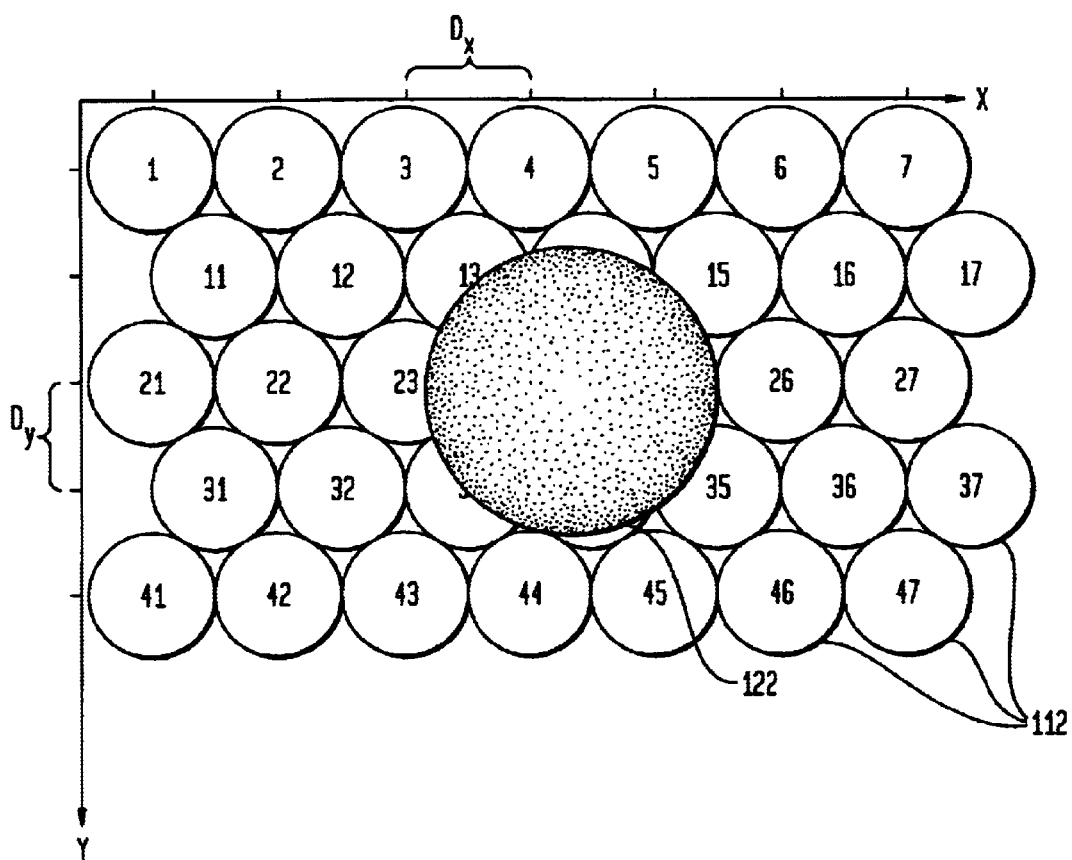
FIG. 4 shows an array of sensors and an event.
Figure 5:
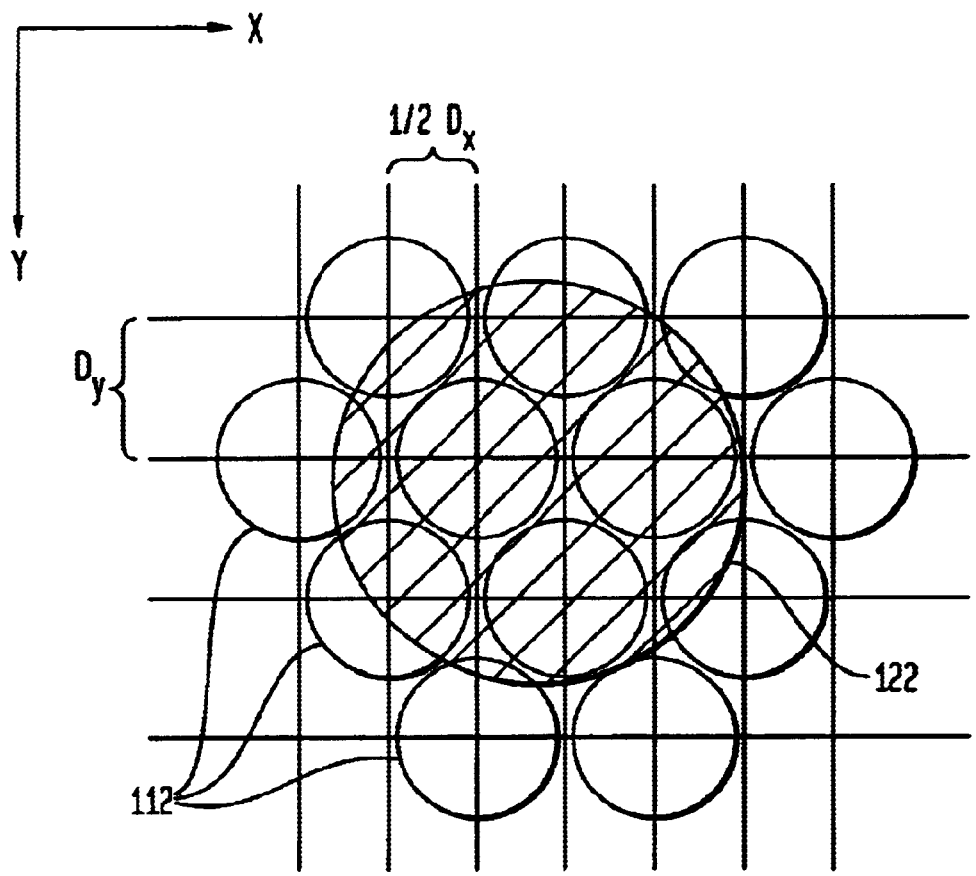
FIG. 5 shows the event and the sensors that are affected by the event.
Figure 6:
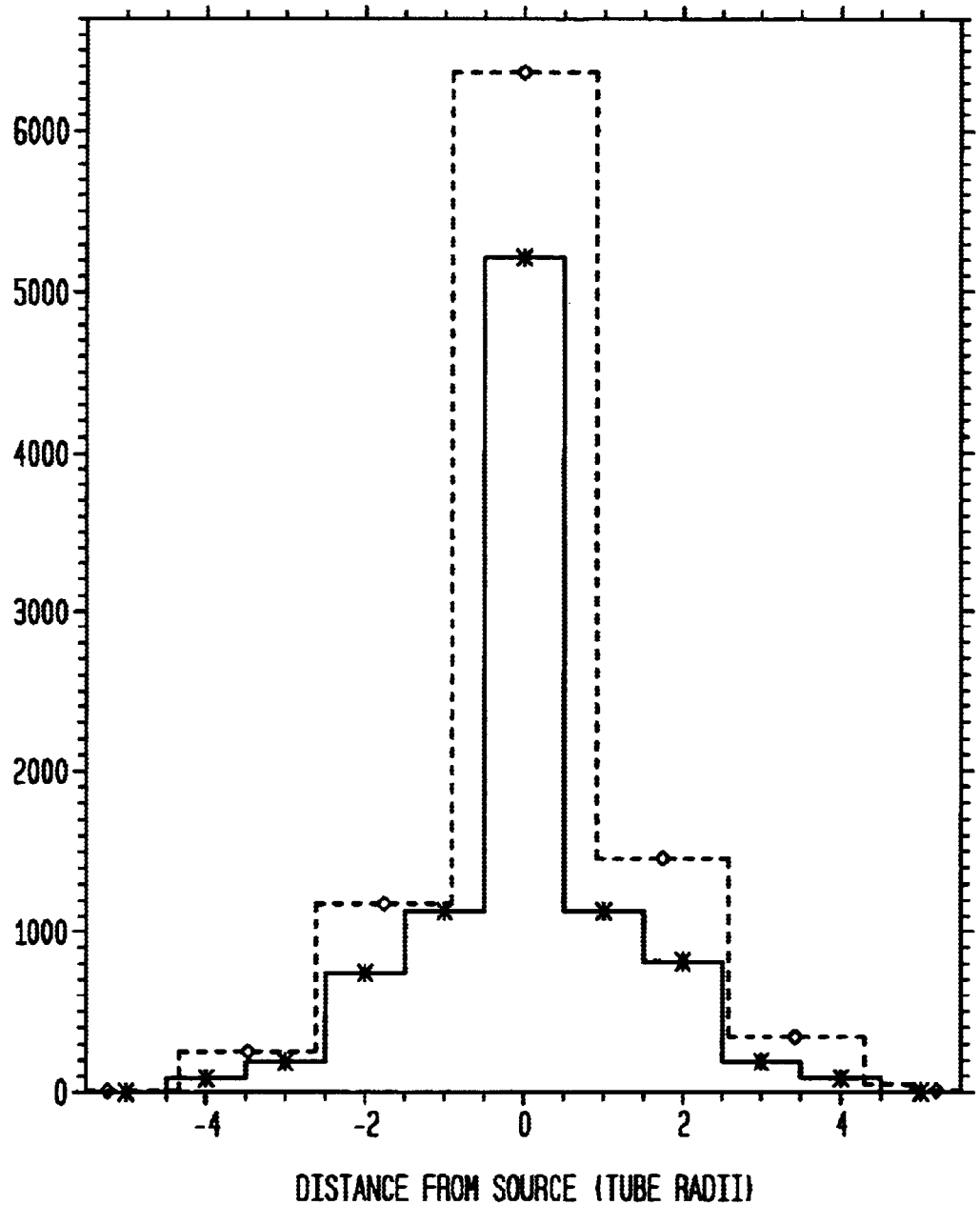
FIG. 6 shows X and Y position histograms for a single event (note that the areas under the two histograms are equal)

According to the invention, an anisotropic transfer function is applied to sensor readings of an imaging device. The anisotropic transfer function may be thought of as a modification of the isotropic transfer function $TF(Z_i)$ of the prior art. The anisotropic transfer function of the invention is dependent on the direction in which the sensor readings are taken to generate a histogram for event position calculation.

In a first embodiment, the invention employs two different transfer functions, $TF_x(Z_i)$ and $TF_{y(Zi)}$ that are used when calculating the estimates of the X and Y positions, respectively. According to the invention, equation 3 of the prior art therefore may be generalized to:

$$x'=\text{Centroid}(\{x_i, Z_i\}, TF_X) \quad (4)$$

and $$y'=\text{Centroid}(\{y_i, Z_i\}, TF_Y) \quad (5)$$

where $Z_i$ is the signal from the $i^{th}$ sensor (such as a photomultiplier tube), $x_i$ and $y_i$ are the position of the $i^{th}$ sensor, and $TF_X$ and $TF_Y$ are the different transfer functions used to respectively compute the X coordinate and the Y coordinate of the detected event. FIG. 7 shows one example of different transfer functions $TF_X$ and $TF_Y$. The anisotropic transfer function thus modifies the same reading from a sensor differently, depending upon the particular event coordinate (i.e., X or Y) being calculated.

The anisotropic transfer function of the invention thus results in different processing of the sensor readings in the X direction and in the Y direction. The end result is better spatial resolution and linearity of an event 122 across the entire sensor array in all directions.

The principle of the invention may be applied to any array of sensors collecting any signal (e.g., light, radiation, electric charge, magnetic waves, sound or pressure waves) to be used for determining the center of a signal source. This includes gamma cameras, also referred to as gamma-ray cameras or Anger cameras, and also may apply to other devices such as magnetic resonance imaging (MRI), PET imaging, ultrasonic imaging, and generally any type of light imaging, radioactive imaging, electron imaging (such as electron scanning microscopes), etc. Moreover, it may apply to any type of imaging process, including medical imaging, manufacturing process imaging, seismology, industrial testing, etc. The anisotropic transfer function of the invention may be applied to any imaging device and sensor configuration that includes non-isotropic signal readings.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A method for radiation event location in an anisotropic radiographic imaging device that includes a plurality of sensors arranged in an array, comprising the steps of:
    obtaining output signals from at least a subset of said plurality of sensors in response to a radiation event occurring at a certain position in said array defined by a set of spatial coordinates;
    applying an anisotropic transfer function to said sensor output signals, which modifies said sensor output signals differently in accordance with a direction along the array over which consecutive sensor output signals are used to calculate a particular one of said set of spatial coordinates; and
    calculating said set of spatial coordinates using said modified sensor output signals.

2. The method of claim 1, wherein said plurality of sensors comprise a plurality of photomultiplier tubes.

3. The method of claim 1, wherein said imaging device further includes a scintillation crystal that emits photons in response to incident radiation interacting with said scintillation crystal.

4. The method of claim 1, wherein said imaging device is a gamma camera.

5. The method of claim 1, wherein said anisotropic transfer function modifies said sensor output signals to calculate a spatial coordinate in an X-axis direction according to a formula $x'=\text{Centroid}(\{x_i, Z_i\}, TF_X)$.

6. The method of claim 5, wherein $TF_x$ is a function of the distance from the event to the surface of the crystal.

7. The method of claim 1, wherein said anisotropic transfer function modifies said sensor output signals to calculate a spatial coordinate in a Y-axis direction according to a formula $y'=\text{Centroid}(\{y_i, Z_i\}, TF_Y)$.

8. The method of claim 7, wherein $TF_y$ is a function of the distance from the event to the surface of the crystal.

9. The method of claim 1, wherein said array is a substantially hexagonally arranged sensor array, with centers of sensor columns along a Y-axis being farther apart than centers of sensor rows along an X-axis.

10. An anisotropic imaging device, comprising;
    a plurality of sensors arranged in an array, at least a subset of said plurality of sensors generating an output signal in response to a radiation event occurring at a certain position in said array defined by a set of spatial coordinates;
    a processor communicating with said plurality of sensors;
    said processor obtaining said output signals from said subset of said plurality of sensors;
    said processor applying an anisotropic transfer function to said sensor output signals, which modifies said sensor output signals differently in accordance with a direction along the array over which consecutive sensor output signals are used to calculate a particular one of said set of spatial coordinates; and
    said processor calculating said set of spatial coordinates using said modified sensor output signals.

11. The anisotropic imaging device of claim 10, wherein said received radiation is gamma radiation.

12. The anisotropic imaging device of claim 10, wherein said anisotropic imaging device further includes a scintillation crystal and said received radiation is photon emission from said scintillation crystal.

13. The anisotropic imaging device of claim 10, wherein said imaging device is a gamma camera.

14. The anisotropic imaging device of claim 10, wherein said plurality of sensors comprise photomultiplier tubes.

15. The anisotropic imaging device of claim 10, wherein said anisotropic transfer function modifies said sensor output signals to calculate a spatial coordinate in an X-axis direction according to a formula $x'=\text{Centroid}(\{x_i, Z_i\}, TF_X)$.

16. The anisotropic imaging device of claim 15, wherein $TF_x$ is a function of the distance from the event to the surface of the crystal.

17. The anisotropic imaging device of claim 10, wherein said anisotropic transfer function modifies said sensor output signals to calculate a spatial coordinate in a Y-axis direction according to a formula $y'=\text{Centroid}(\{y_i, Z_i\}, TF_Y)$.

18. The anisotropic imaging device of claim 17, wherein $TF_y$ is a function of the distance from the event to the surface of the crystal.

19. The anisotropic imaging device of claim 10, wherein said array is a substantially hexagonally arranged sensor array, with centers of sensor columns along a Y-axis being farther apart than centers of sensor rows along an X-axis.

* * * * *